April 7, 1964 G. KRETSCHMER 3,127,672
METHOD OF ASSEMBLING A HOSE FITTING
Filed Feb. 25, 1960
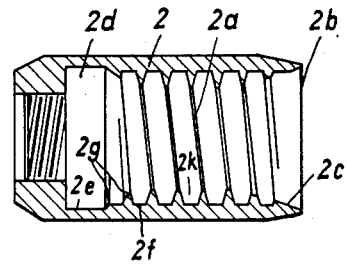
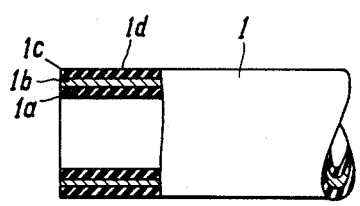
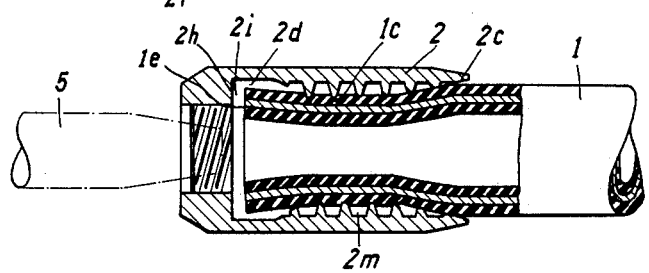
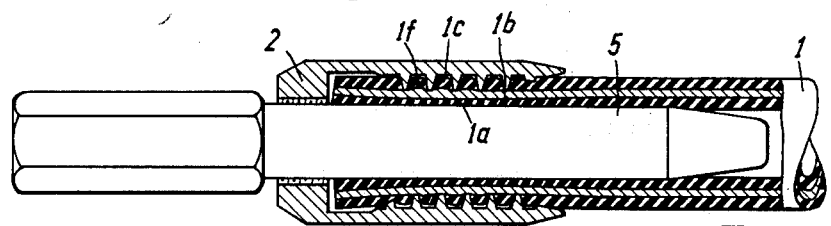
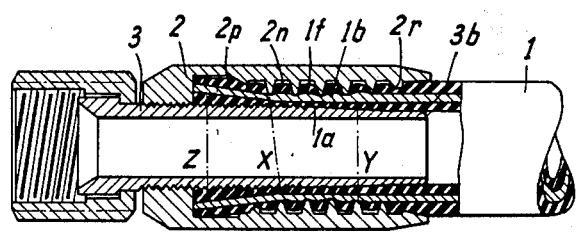
Inventor:
GEORG KRETSCHMER
By Hane and Nydick
ATTORNEYS

United States Patent Office 3,127,672
Patented Apr. 7, 1964

3,127,672
METHOD OF ASSEMBLING A HOSE FITTING
Georg Kretschmer, Darmstadt-Eberstadt, Germany, assignor to Techno-Chemie Kessler & Co. G.m.b.H., Frankfurt am Main, Germany
Filed Feb. 25, 1960, Ser. No. 10,963
Claims priority, application Germany Mar. 7, 1959
1 Claim. (Cl. 29—450)

The invention relates to a method of assembling a hose fitting consisting of a hose ferrule with a thread to grip the end of the hose and a hose nipple, preferably with an opposite thread, on a high-pressure hose with wire-gauze or coiled wire armouring between the outer and the inner rubber, without stripping off the outer rubber, and to a hose ferrule for carrying out the method.

Numerous embodiments of hose fittings are known. Accordingly, various methods are also known for mounting such hose fittings on high-pressure hoses.

For example, it is already known to mount such a fitting on a high-pressure hose, which may be provided with a yarn reinforcement, without stripping off the outer rubber, using an assembly mandrel to widen the hose and to screw in the hose nipple.

It is further known to mount such a fitting on a high-pressure hose with wire-gauze or coiled-wire armouring, after first stripping off the outer rubber in order to provide as tightly meshed a connection as possible between the thread of the hose ferrule and the wire armouring of the hose.

This type of assembly has the disadvantage, however, that an additional operation is necessary because of the stripping, which has to be carried out very carefully, and that cavities are formed within the hose ferrule and may have a disadvantageous effect.

As a result of the high pressures of more than 1000 atm. which are now current for high-pressure hoses, hoses have been developed in which the outer rubber is so firmly anchored to the wire armouring that stripping is only possible with great difficulty, if at all. Such hoses therefore cannot be provided with hose fittings by the said known methods.

The object of the invention is to provide a method of assembling a hose fitting consisting of a hose ferrule with a thread to grip the end of the hose and a hose nipple with a thread which is preferably opposite, on a high-pressure hose with wire-gauze or coiled wire armouring between the outer and the inner rubber, without stripping off the outer rubber, which method can be used without particular difficulty on such high-pressure hoses of any type and ensures a perfectly tight connection between the hose fitting and the hose even at the highest pressures.

In the assembly of a hose fitting consisting of a hose ferrule with a thread to grip the end of the hose and a hose nipple having a preferably opposite thread on a high-pressure hose with wire-gauze or coiled wire armouring between the outer and inner rubber without stripping off the outer rubber, the object of the invention is acheived as a result of the fact that the end of the hose, which is preferably not inserted right into the hose ferrule, is widened out by means of a mandrel, before the nipple is inserted, to such an extent that the internal thread of the hose ferrule cuts through the outer rubber down to the armouring.

In order to carry out the method according to the invention, in a hose ferrule having a right-handed internal thread, for example, to grip the end of the hose and a compartment between the thread and the left-handed internal thread, for example, for the hose nipple, according to the invention the space between the turns of the thread is greater than the volume of the outer rubber displaced during the widening of the end of the hose and during the introduction of the nipple.

According to a further feature of the invention, the diameter of the compartment is larger than the external diameter of the thread and the thread itself is made to taper at preferably both ends inside the ferrule.

Furthermore, when the hose fitting is assembled, the thread of the nipple preferably extends as far as the centre portion of the thread of the hose ferrule.

These and other objects of the invention are illustrated by way of example and purely diagrammatically in the drawing which shows, either in section or partially in section:

FIGURE 1 the hose ferrule;
FIGURE 2 the end of the hose;
FIGURE 3 the end of the hose after being screwed into the hose ferrule;
FIGURE 4 an illustration corresponding to FIGURE 3 after the introduction of the mandrel, and
FIGURE 5 the fitting fully assembled on the end of the hose.

The hose 1 (FIGURE 2) is screwed into the, for example right-hand thread 2a of the ferrule 2 (FIGURE 1) which is held in a chuck. The ferrule 2 (FIGURE 1) is bevelled in a taper 2c from the end 2b to the thread-core diameter, and the diameter of the taper at the end 2b is larger than the external diameter 1d of the hose 1 (FIGURE 2). The thread 2a (FIGURE 1) ends in the compartment 2d, the diameter 2e of which is larger than the external diameter 2f of the thread 2a. The thread 2a (FIGURE 1) has a tapered chamfer 2g towards the compartment. When the hose 1 (FIGURE 3) is screwed into the ferrule 2, the hose is guided inwards by the tapered thread surfaces 2c (FIGURE 3) being constricted to the core diameter of the thread and opens out again under the force of the stresses caused by the constriction, on entering the compartment 2d. FIGURE 3 shows the deformation of the hose. The hose is preferably not introduced into the ferrule 2 until it abuts against the end 2h but a free space 2i is left between the end 2h of the ferrule and end 1e of the hose.

The hose tension caused by the constriction of the hose forces the outer rubber 1c (FIGURE 3) into the thread, and the outer rubber 1c is cut into by the sharp turns of the thread. The tension is not sufficient, however, to cut through the outer rubber as far as the wire armouring. As a result of forcing in the mandrel 5—indicated in FIGURE 3 and shown in FIGURE 4—which is greased with a suitable lubricant to reduce the friction, the hose is forced apart at its constriction, the outer rubber 1c (FIGURE 4) is forced completely into the thread, and the sharp turns of the thread cut through the outer rubber 1c as far as the wire gauze 1b. The inner rubber 1a (FIGURE 4), which is likewise strongly compressed in the region of the thread bends the wire gauze 1b into the space 2k between the threads (FIGURE 1); undulation 1f (FIGURE 4).

After the extraction of the mandrel 5, the nipple 3 is assembled in the usual known manner. In the course of screwing in, the hose wall is slowly and steadily pressed tight into the ferrule by the tapered portion 3b of the nipple (FIGURE 5).

As can be seen from FIGURE 5, the spaces 2m (FIGURE 3) between the thread are so large that the cut outer rubber (FIGURE 5) and the undulations 1f (FIGURE 5) in the steel wire gauze 1b have plenty of room, that is to say a free space 2n is still left. The undulation 1f in the steel wire gauze, caused by the inner rubber 1a being under pressure, ensures a firm anchoring of the steel wire gauze in the ferrule.

The pressure is strongest in the zone X, at which point the inner rubber 1a is practically dead, that is to say it is no longer resilient. In the zone Y, the resilience of the inner rubber increases steadily towards the end of the ferrule up to its full value. This zone therefore forms a seal between the outer wall of the nipple and the inner wall of the hose. In the zone Z, the inner rubber has its full resilience and consequently can open out the end of the steel wire gauze. As a result, the gripping of the hose is substantially aided by the pressure in the zone X. The end of the hose has plenty of room in the cavity in the compartment $2p$. From the zone X, some of the inner rubber $1a$ is displaced to the left into the compartment $2p$ and to the right towards the end of the nipple.

In the region of the tapered thread surfaces $2r$, the outer rubber is not cut through to the wire gauze but only pressed against the blunt tapered thread surfaces. As a result, a completely reliable sealing of the hose coupling against moisture from the outside is assured so that the steel wire gauze cannot be corrosively attacked.

The invention is not restricted to the embodiment described and illustrated. Instead, details may be modified without deviating from the basic idea of the invention.

I claim:

A method of assembling a high pressure hose fitting including an internally threaded ferrule and an externally threaded nipple upon a reinforced high pressure hose having an inner and an outer layer of flexible material and a reinforcing layer sandwiched between said flexible layers, said method comprising the steps of first threading said ferrule upon one end of a hose having a wider outer diameter than the inner diameter of the ferrule to cut into the surface of the outer layer of the hose and to force the material of said cut outer layer partly into the valleys between the teeth of the threads of the ferrule, then forcing a rigid and solid mandrel having an outer diameter larger than the inner diameter of the hose into the hose end received by the ferrule to expand said hose end to an inner diameter such that the teeth of the threads of the ferrule cut through the entire thickness of the outer hose layer and the cut material is forced to penetrate deeper into the valleys between the teeth, then withdrawing the mandrel, and finally threading the nipple into said hose end to expand the same to an inner diameter such that the reinforcing layer now exposed by the cuts in the outer layer is also partly forced into said valleys.

References Cited in the file of this patent

UNITED STATES PATENTS

| | | |
|---|---|---|
| 635,636 | Bailey | Oct. 24, 1899 |
| 2,219,266 | Hirsch | Oct. 22, 1940 |
| 2,314,000 | Lusher et al. | Mar. 16, 1943 |
| 2,399,790 | Conroy | May 7, 1946 |
| 2,797,111 | Beazley | June 25, 1957 |
| 2,829,671 | Ernst et al. | Apr. 8, 1958 |
| 2,965,395 | Schmohl et al. | Dec. 20, 1960 |